US009443153B1

(12) United States Patent
Gupta et al.

(10) Patent No.: US 9,443,153 B1
(45) Date of Patent: Sep. 13, 2016

(54) AUTOMATIC LABELING AND LEARNING OF DRIVER YIELD INTENTION

(71) Applicants: VOLKSWAGEN AG, Wolfsburg (DE); AUDI AG, Ingolstadt (DE)

(72) Inventors: Somudro Gupta, Belmont, CA (US); Philipp Alexander Martinek, Markt Indersdorf (DE); Wilko Schwarting, Hude (DE); Jason Scott Hardy, Union City, CA (US); Bryant Wenborg Mairs, Santa Cruz, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/737,666

(22) Filed: Jun. 12, 2015

(51) Int. Cl.
  G06K 9/00 (2006.01)
  G07C 5/08 (2006.01)
  G01S 19/13 (2010.01)
  G06K 9/62 (2006.01)
  G06F 17/30 (2006.01)
  G06K 9/52 (2006.01)

(52) U.S. Cl.
  CPC ............ G06K 9/00798 (2013.01); G01S 19/13 (2013.01); G06F 17/3028 (2013.01); G06K 9/52 (2013.01); G06K 9/627 (2013.01); G07C 5/08 (2013.01)

(58) Field of Classification Search
  None
  See application file for complete search history.

(56) References Cited

U.S. PATENT DOCUMENTS 8,788,134 B1 7/2014 Litkouhi et al.
2014/0195093 A1* 7/2014 Litkouhi ............ B62D 15/0255
701/23

OTHER PUBLICATIONS

Xiong et al ("HMM and HSS Based Social Behavior of Intelligent Vehicles for Freeway Ramp", 2014).*
Wei et al ("Autonomous vehicle social behavior for highway entrance ramp management", 2013).*
US 8,914,212, 12/2014, Urmson et al. (withdrawn).
New Honda Smart Cruise Control Predicts Other Motorists' Future Idiocy; downloaded from http://autoblog.search.aol.com/ search?Q=official; Jan. 14, 2015.
Xiong et al.; HMM and HSS Based Social Behavior of Intelligent Vehicles for Freeway Entrance Ramp; International Journal of Control and Automation; 2014; pp. 79-90; vol. 7, No. 10.

* cited by examiner

*Primary Examiner* — Avinash Yentrapati
(74) *Attorney, Agent, or Firm* — Barnes & Thornburg LLP

(57) ABSTRACT

A yield determination system for automatically collecting, determining, and labeling yield behaviors of vehicles during cooperative driving scenarios. The system includes sensors for detecting the start and stop of the scenario, a data recorder for automatically collecting the data, an annotation unit for automatically labeling features of interest about the vehicle and surrounding vehicles during the scenario. The labeled file may be automatically uploaded and processed to insert the labelled features into a learning model to predict vehicle behavior in cooperative driving scenarios.

18 Claims, 6 Drawing Sheets

AUTOMATIC LABELING AND LEARNING OF DRIVER YIELD INTENTION

BACKGROUND

The present disclosure relates to systems, components, and methodologies for automatically collecting and labeling data. In particular, the present disclosure relates to systems, components, and methodologies for automatically collecting and labeling data features about a piloted vehicle and the surrounding vehicles.

SUMMARY

According to the present disclosure, systems, components, and methodologies are provided for automatically collecting and labeling data about a piloted vehicle and the surrounding vehicles.

In illustrative embodiments, an in-vehicle yield determination unit may automatically determine when the vehicles around a piloted vehicle are yielding or not yielding during merging driving scenario. The yield determination unit may receive an indication of a merging driving scenario, sensed data features about other vehicles in proximity to the piloted vehicle, and sensed positioning data features about the road while the piloted vehicle successfully changes lanes in the merge situation. The yield determination unit may determine whether each car sensed in the scenario is yielding or not yielding relative to the piloted vehicle and labels the vehicles respectively.

Sensed and determined features may be automatically labeled in the data file. The labelled file may be uploaded to a central server along with data files from other piloted vehicles. The labelled features from the data files may be extracted and used to refine a continuously improving model on driver behavior.

In illustrative embodiments, the yield determination unit may detect vehicles behind and in front of the piloted vehicle. The yield determination unit may determine the duration for which the vehicles are sensed and their proximity to the piloted vehicle. If the vehicles sensed finish in front of the piloted vehicle upon completion of the driving maneuver, they may be labelled "not yielding." If the vehicles sensed finish behind the piloted vehicle upon completion of the driving maneuver, they may be labelled "yielding." On the other hand, if the vehicles are only sensed very briefly, or the system labels them both yielding and unyielding, they may be discarded during a file integrity check. Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIGS. 1A-1D constitute a diagrammatic and perspective view of an exemplary automatic data collection and annotating process showing a first point where a sensor may receive driver input and the piloted car may start recording data, a second point where the sensor may receive driver input that the driver maneuver may be completed, a third point where the vehicle annotation perception module may annotate piloted car features, road features, and other vehicle features in the data frame sub-windows to automatically determine a driving scenario and behavior scenarios, and a fourth point where the labelled data frames may be uploaded to a cloud for processing and integration into a behavior learning model;

Figure 1:
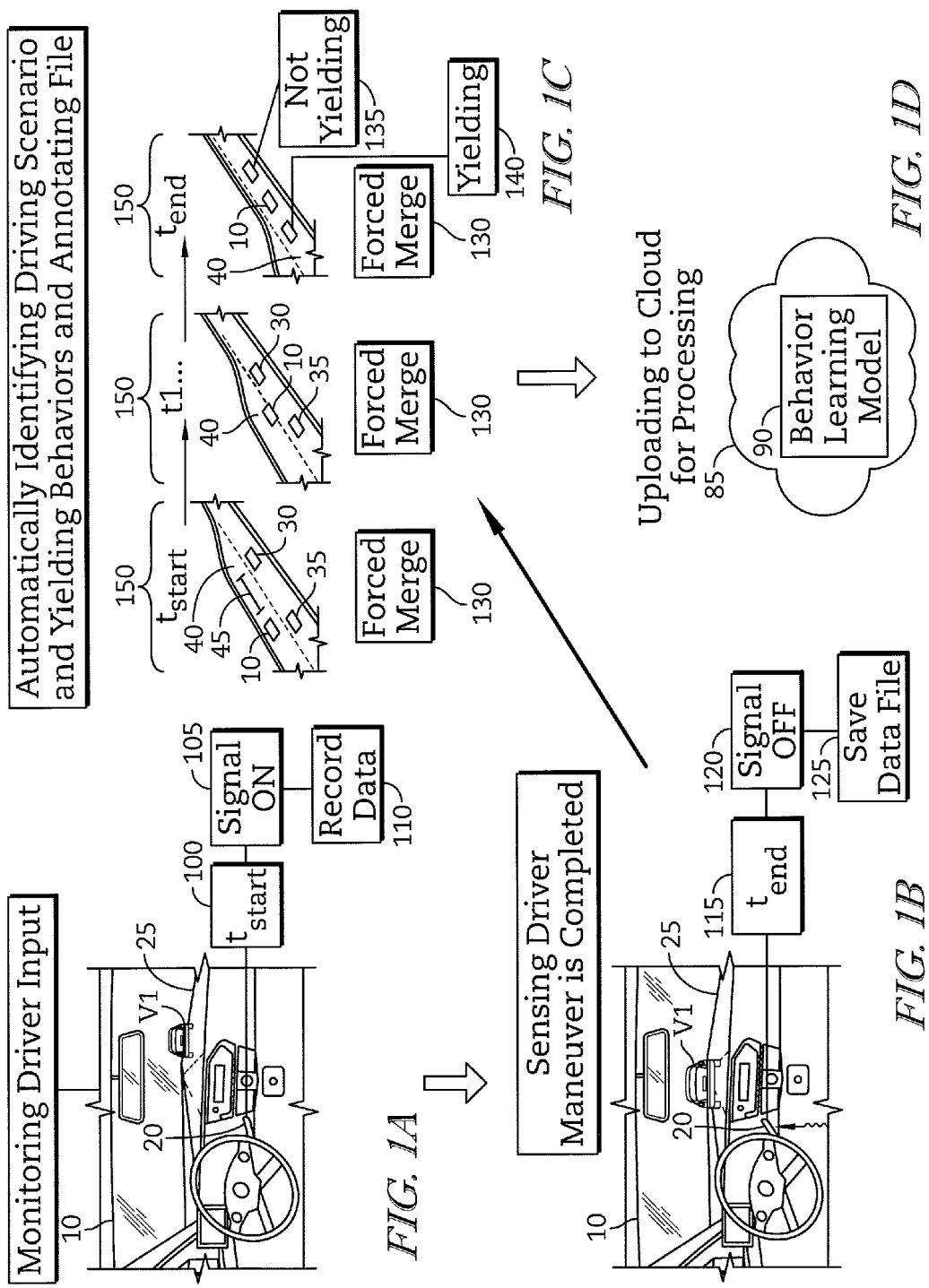
FIG. 1A is a perspective view of a driver initiating a lane change due to the left lane ending with another vehicle in view in the right lane in front of him by shifting his turn signal on which starts the recording of data in the piloted vehicle data recording system.
FIG. 1B is a perspective view of the driver of the piloted car having completed a lane change to the right lane behind the other vehicle shifting the turn signal in the vehicle to an off position indicating completion of the lane change, stopping the data recording and saving it to a visual file.
Figure 2:
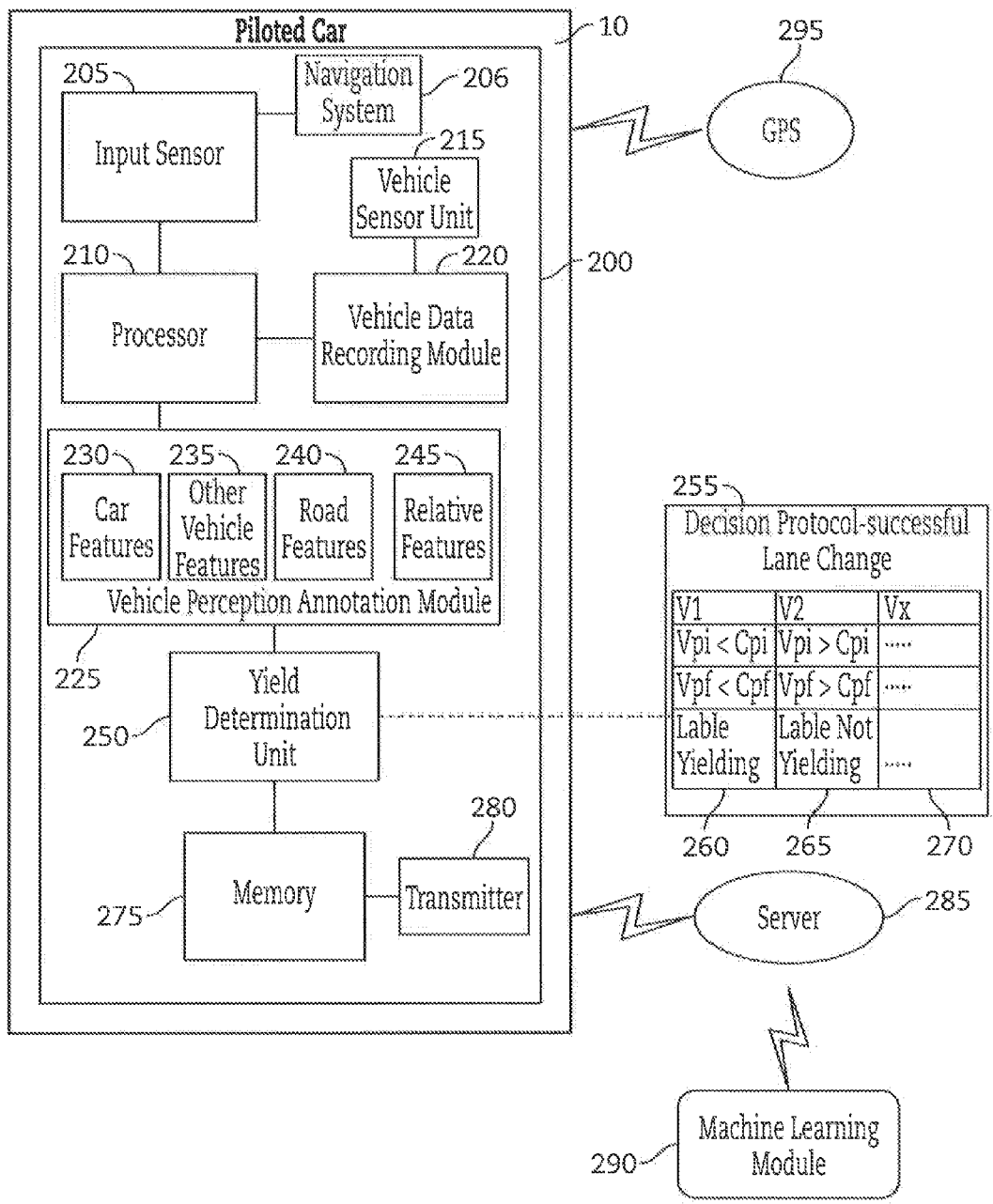
Figure 3:
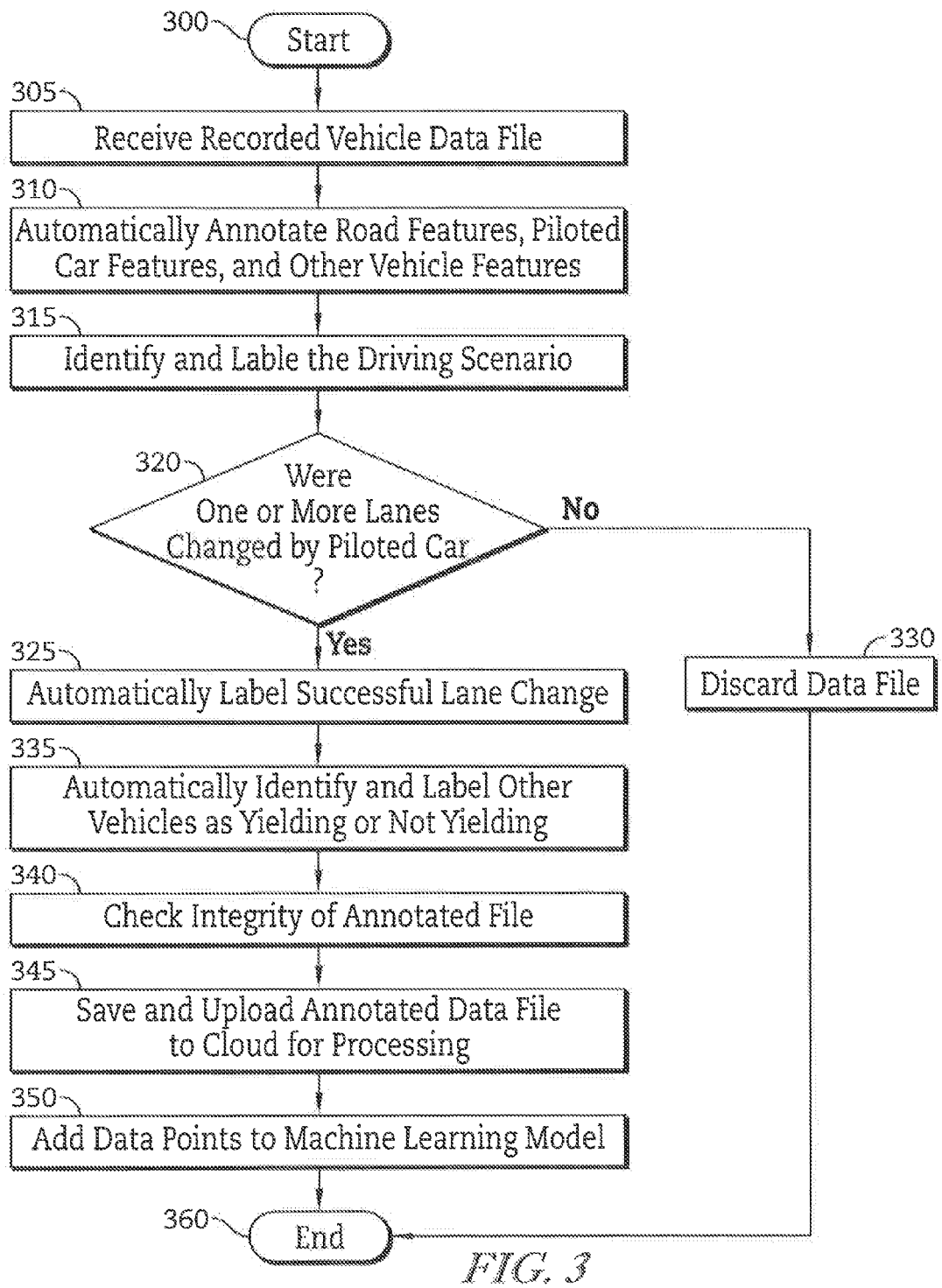
Figures 4A, 4B:
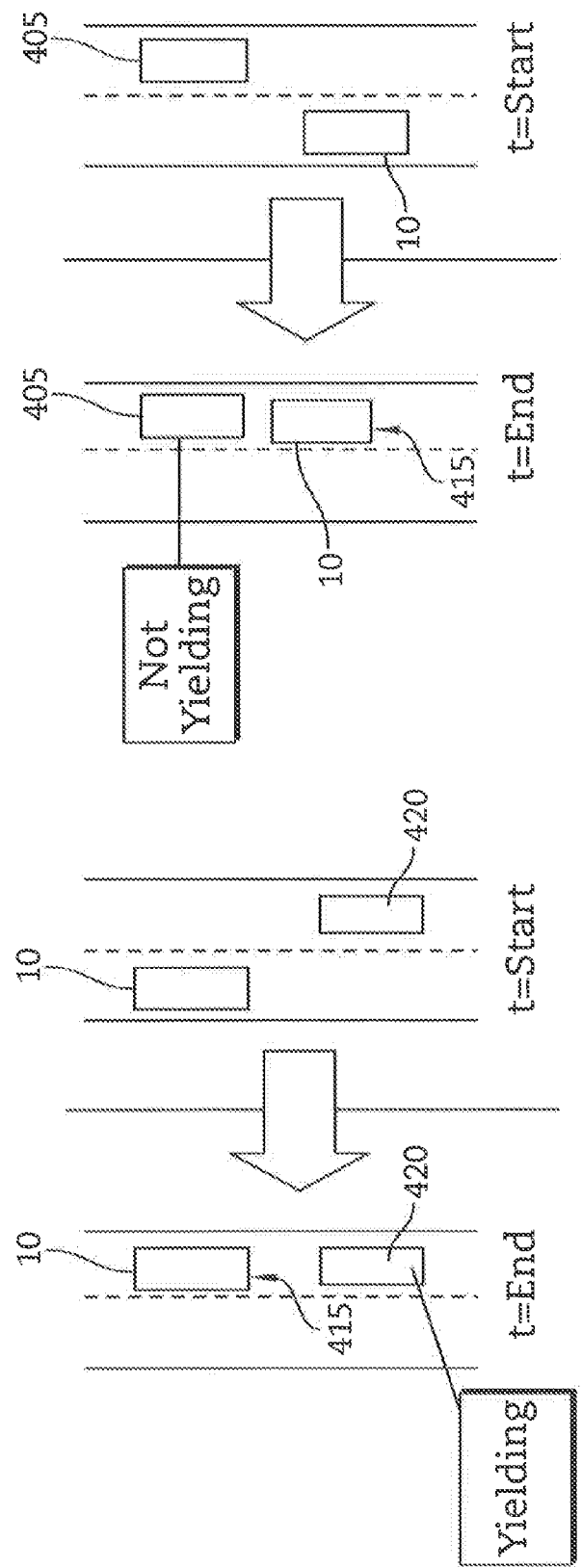
Figures 4C, 4D:
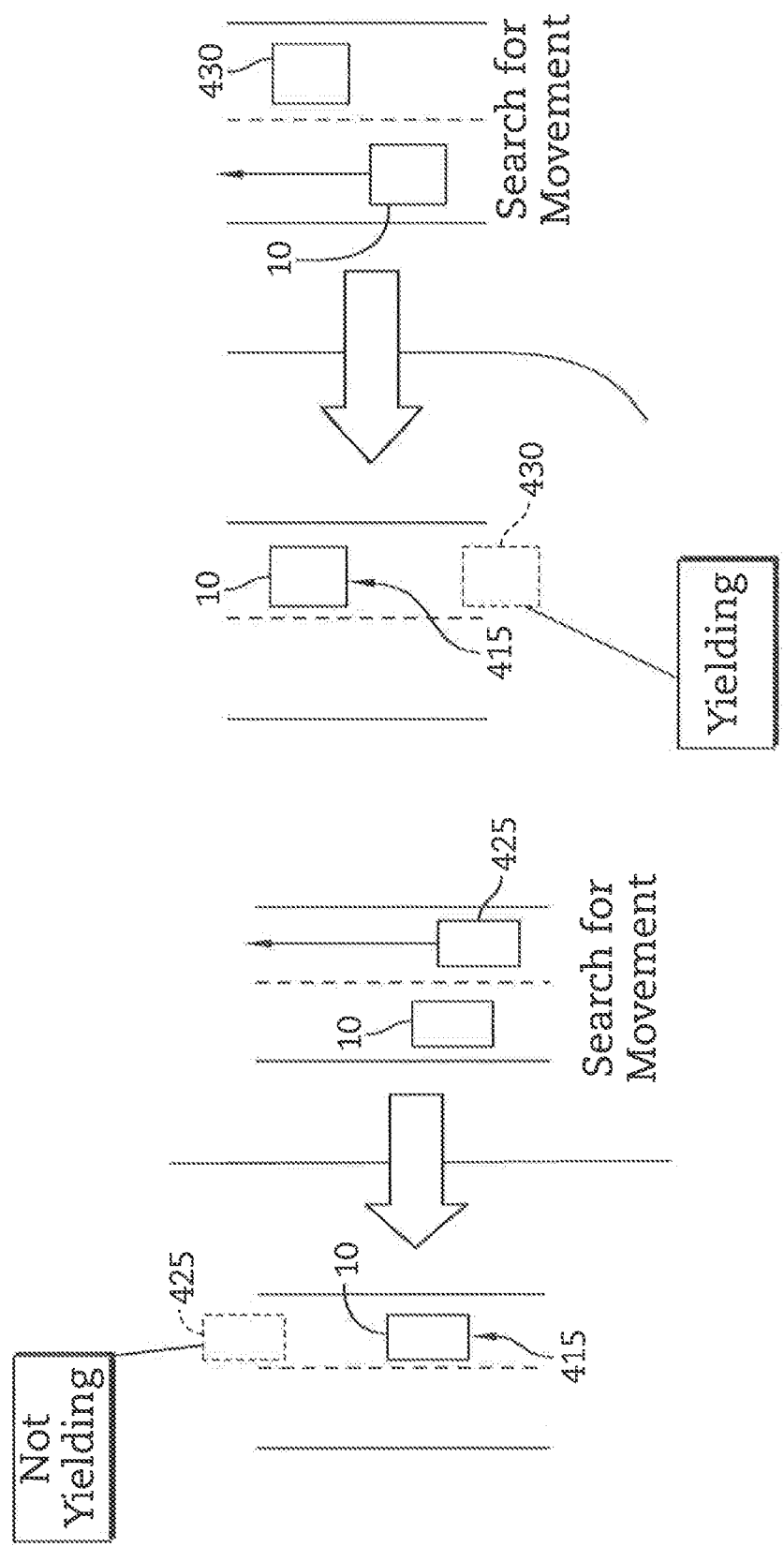
Figure 5:
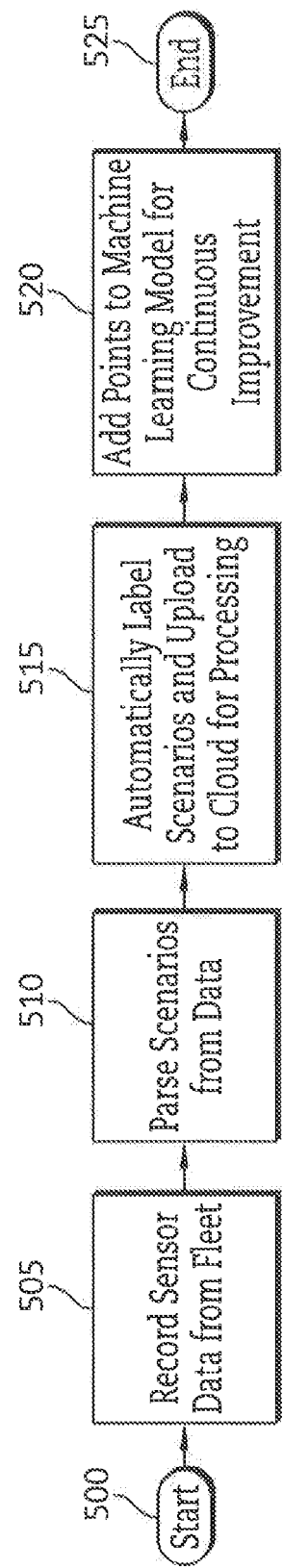

FIG. 1C is a plan view of the video file annotated frame by frame showing the driving scenario identified; the piloted vehicle features identified; relative features identified; and features of two other vehicles identified for a start time, a first time and an end time, where the final position of the two other vehicles relative the piloted car automatically identifies the vehicles as yielding and not yielding;

FIG. 1D is a diagrammatic view showing the annotated data files are uploaded to a cloud to add the annotated data points to a behavior learning model to better predict other vehicles' yielding behaviors;

FIG. 2 is a diagrammatic view of the yield data collection and annotating system showing that the system includes an input sensor that may signal the processor to start recording input from the vehicle sensor unit, a vehicle perception annotation module for detecting various features in the recorded data frames, a yield decision unit for exemplary vehicles depicted in FIG. 1C, and memory and transmitter units for transmitting the annotated data to the machine learning module;

FIG. 3 is a flow diagram of the data labeling process implemented by the vehicle perception annotation module and subsequent yielding or not yielding subroutines implemented by the yield determination unit shown in FIG. 2;

FIGS. 4A-D constitute a diagrammatic and plan view of a process showing the automatic yielding and not yielding labeling subroutines for a successful lane change, the process showing yielding and not yielding labeling for vehicles immediately adjacent the piloted car at time $t_{end}$ as well as yielding and not yielding labeling for all cars that were identified during the recorded time period but are not adjacent to the piloted car at $t_{end}$;

FIG. 4A shows a plan view of the successful lane change labeling subroutine of a vehicle behind the piloted car at $t_{start}$ and immediately behind the piloted car at $t_{end}$ being labelled yielding;

FIG. 4B is a plan view of the successful lane change labeling subroutine showing a vehicle in front of the piloted car at time $t_{start}$ and immediately in front of the piloted car at $t_{end}$ being labelled not yielding;

FIG. 4C is a plan of the successful lane change labeling subroutine view showing all other identified vehicles that passed the piloted car and are not immediately adjacent the piloted car at time $t_{end}$ as shown in FIGS. 4A-B are labelled not yielding;

FIG. 4D is a plan view of the successful lane change labeling subroutine showing all other identified vehicles that were passed by the piloted car and are not immediately adjacent the piloted car at time $t_{end}$ as shown in FIGS. 4A-B, are labelled yielding;

FIG. 5 is a diagrammatic view of a process as illustrated in FIG. 1, applied to an entire fleet of vehicles, increasing the data points added to the machine learning model.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

FIGS. 1A-1D constitute a diagrammatic and perspective view of an exemplary automatic data collection and annotating process showing a first point where a sensor may receive driver input and the piloted car may start recording data, a second point where the sensor may receive driver input that the driver maneuver may be completed, a third point where the vehicle annotation perception module may annotate piloted car features, road features, and other vehicle features in the data frame sub-windows to automatically determine a driving scenario and behavior scenarios, and a fourth point where the labelled data frames may be uploaded to a cloud for processing and integration into a behavior learning model.

The driving scenario illustrated in FIG. 1A-C shows a road feature of two lanes, with the left lane merging to the right lane 40. Disclosed embodiments of a yield determination system may detect when a driving maneuver starts and stops to generate a data file as illustrated in FIGS. 1A-B by detecting the start and stop of a turn signal indicator 20.

In some instances, the start and stop of the maneuver may be determined based on sensed input from Global Positioning System ("GPS") tracking. A navigation system may be pre-programmed with geolocation coordinates of known force merge areas such as intersections and conclude that the driving maneuver has started when the piloted vehicle 10 has arrived at an intersection or rotary and completed when the car has passed through the intersection.

FIG. 1A is a perspective view of a driver initiating a lane change due to the left lane ending on the road 25 with another vehicle V1 in view in the right lane in front of him by shifting his turn signal 20 on 105 which starts 100 the recording of data 110 in the piloted vehicle data recording system. By integrating the start of recording with a turn signal, the driver is not required to remember to perform any additional steps in order to record data of the driving maneuver.

FIG. 1B is a perspective view of the driver of the piloted car having completed a lane change to the right lane of the road 25 behind the other vehicle V1 shifting the turn signal 20 in the vehicle to an off position 120 indicating completion of the lane change 115, stopping the data recording and saving it to a visual file 125. By integrating the stop of recording with turning a turn signal off, the driver is not required to remember to perform any additional steps in order to stop recording data at the end of a driving maneuver.

FIG. 1C is a plan view of the video file annotated frame by frame showing the driving scenario identified; the piloted vehicle features identified; relative features identified; and features of two other vehicles identified for a start time, a first time and an end time, where the final position of the two other vehicles relative the piloted car automatically identifies the vehicles as yielding and not yielding. The visual data is divided into discrete frames 150, which can include as many frames as the sampling rate of data permits. This allows a plurality of data points to be annotated for each car over time to increase the accuracy of tracking and outputting vehicle behavior. Relativity features, such as distance 45 between the piloted vehicle and another vehicle 30 can be annotated. Road features, such as left lane ending 40 can be annotated. The type of lane change such as forced merge 130 can be annotated. Additionally, vehicles that are not sensed at $t_{start}$ or $t_{end}$ but are sensed during the intervening frames can be identified by this parsing of data frames. As can be seen, in the visual data collected, there are two vehicles identified 30, 35. The vehicle in front 30 has been automatically labelled not yielding 135 and the vehicle behind 35 the piloted car 10 has been automatically labelled yielding 140.

FIG. 1D is a diagrammatic view showing the annotated data files are uploaded to a cloud 85 to add the annotated data points to a behavior learning model 90 to better predict other vehicles' yielding behaviors. The behavior learning model can collect annotated data files from a plurality of vehicles over time. Therefore, the system has access to a larger and more varied pool of data leading to a more accurate model.

FIG. 2 is a diagrammatic view of the yield data collection and annotating system showing that the system includes an input sensor that may signal the processor to start recording input from the vehicle sensor unit, a vehicle perception annotation module for detecting various features in the recorded data frames, a yield decision unit for exemplary vehicles depicted in FIG. 1C, and memory and transmitter units for transmitting the annotated data to the machine learning module. As illustrated in FIG. 2, a yield determination system 200 may perform an automatic yield determination protocol 255 as shown in FIGS. 1A-D and 3-5. Yield determination system 200 may include computer code that can be loaded onto an in-vehicle processor for execution to automatically detect and label 260, 265 when other vehicles are yielding or not yielding during a merging driving scenario. The yield determination system 200 may monitor driver input and automatically record data when a driving maneuver is started through when it is completed as suggested in FIGS. 1A-1B. Yield determination system 200 may automatically detect and label piloted car features 230, features of other identified vehicles 235, road features 240, and relativity features 245 amongst the piloted car, other vehicles, and the road.

Yield determination unit 250 may then use these features to make an automatic determination as to whether the vehicle is yielding or not yielding (for example, see the merging scenario 130 illustrated in FIG. 1C, wherein the piloted car turn signal 20 is turned on at 105). This turn signal may signal the processor 210 of the start of a driving maneuver and the vehicle data recording module 220 may start recording data from the vehicle sensor unit 215. When the piloted vehicle turn signal is turned off, this may signal that the maneuver is complete and the data file may be saved (see, 125 in FIG. 1B). The data file can be a video file (as shown in FIG. 1C) and vehicle perception annotation module 225 may automatically annotate features of the piloted vehicle, other vehicle features, and relative features at each relevant time, or frame, between the time $t_{start}$ and time $t_{end}$. Based on the labelled features, the yield determination unit 250 can automatically determine for each additional vehicle over the time lapse of the parsed frames (between the time $t_{start}$ and time $t_{end}$), whether the vehicle was yielding or not yielding and label it accordingly. Subsequently, the labelled file may be uploaded (e.g., to a communication network e.g., the cloud 85 illustrated in FIG. 1D) for processing at which point the labelled data points can be added to a behavior learning model for estimating driving behavior in merge scenarios. Alternatively, in some instances the piloted vehicle may not have a network connection or may have a network connection that is not active/enabled at a particular time when data is being generated. In those instances, the labelled data may be directly loaded onto an on-board behavior learning model located in the piloted vehicle to update a self-learning process, or stored in a buffer/memory for later upload and/or analysis.

In more detail, with reference to FIG. 2, the yield determination system 200 includes an input sensor 205 for detecting the start of a lane change, a processor 210 for receiving the sensed input and signaling the vehicle data recording module 220 to record data from the vehicle sensor unit 215. Input sensor 205 may also detect the completion of a driving maneuver and signals the processor 210 to stop recording data from the vehicle sensor unit. In some embodiments, the vehicle data module 220 may continuously record a period of time, e.g., approximately 30 seconds, of piloted vehicle data in a buffer. Input sensor 205 may detect the start and completion of a lane change and processor 210 may determine the portion of the buffered data corresponding to the times of the start and completion of the lane change, match the times to corresponding times in the buffered data, and signal the vehicle data recording module 220 to save this data to a data file for analysis. Yield determination system 200 also includes a vehicle perception annotation module with subunits that automatically detect and label features of the piloted car 230, other vehicles 235, road 240, and relative features between all of these objects 245. Yield determination system 200 may include yield determination unit 250, which may perform the yield determination process shown in FIGS. 3 and 4A-4D to decide whether other vehicles identified in the recorded vehicle data are yielding or not yielding and label them accordingly.

Alternatively or in addition to the turn signal, the navigation system 206 may be in communications with the input sensor 205 to signal the processor, which responds by starting and stopping the vehicle data recording module 220. In some instances, the GPS 295 tracking may be used to determine when a lane is changed if the driver of the piloted vehicle does not use a turn signal. Based upon GPS data and a navigation system pre-programmed with geolocation coordinates of known force merge areas such as intersections and rotaries, the processor may determine whether the piloted vehicle has passed through this forced merge area, and communicate with input sensor 205. Additionally or alternatively, GPS sensing and camera-based sensing may be combined to determine whether the vehicle has changed position or lane. In this configuration, the vehicle data module 220 may continuously record a period of time, e.g., approximately 30 seconds, of piloted vehicle data in a buffer. At the end of time period, vehicle data module 220 may save the data in response to an input signal from the navigation system 206 and/or camera-based sensor received by the processor 210 indicating a lane change or discard the data if no input is sensed.

Vehicle sensor unit 215 may be configured to capture image data of vehicle surroundings. For example, the vehicle sensor unit 215 may include cameras to obtain image data of the road and other vehicles. Vehicle sensor unit may also include velocity and acceleration sensors as well as lidar, radar, and other known sensors for determining relative distance between vehicles, lane markings, relative velocity and other features for generating a model of the surrounding environment.

The captured data file of sensed input may be sent to the vehicle perception annotation module 225. The vehicle perception annotation module 225 may be implemented as an image recognition module, which may perform pixel-based segmentation of captured frames of image data to apply sub-windowing schemes, such as sliding window detection, to the captured frames of image data in order to identify candidate sub-windows that may contain images of road features, car features and other vehicles. For example, the image recognition module may include a vehicle database that includes training data in the form of images known to contain various types of cars at various locations. For each candidate sub-window, the image recognition module may apply a statistical classification algorithm that forms a prediction on whether the sub-window contains another vehicle and, if so, the relative location to the piloted vehicle in the sub-window. This prediction process may then be repeated for each of the road features 240 and the piloted car features 230.

The vehicle perception annotation module 225 may then label these identified features. Features to be identified and labelled by the vehicle perception annotation module 225 for the piloted car 230 include velocity, acceleration, lateral position on the road, gap to vehicle in front and gap to vehicle in the rear. Similarly, other vehicle features 235 to be labelled include velocity, acceleration, gap to the front of the vehicle and gap to the ear of the vehicle. Road features 240 may include, for example, lane type to the left, lane type the piloted vehicle is in, lane type to the rear of the piloted vehicle, and distance to the end of the lane. Relative features 245 that are labelled may include velocity of the other vehicle relative the piloted vehicle, acceleration of the other vehicle to the piloted car, change in gap space sizes at the rear and front of the piloted vehicles and other vehicles.

Vehicle perception annotation module 225 may process the road features 240 and relative features 245 of the piloted car relative to the road to identify and label the merging scenario. Merge scenarios of interest may include forced merge as shown illustratively in FIG. 1C, where the lane the piloted vehicle is in is ending. Additional merge scenarios that can be programmed to be identified include mandatory lane changes, unforced lane changes, intersection stops (4-way, 2-way, stop sign, traffic signal) and rotary merges. As stated with respect to vehicle identification, the vehicle perception annotation module may identify the merging scenario via the road features sub unit by detecting road features in the captured frames of image data.

FIG. 3 is a flow diagram of the data labeling process implemented by the vehicle perception annotation module and subsequent yielding or not yielding subroutines implemented by the yield determination unit shown in FIG. 2.

The process starts when a recorded vehicle data file is received by the system after the completion of a sensed driving maneuver. At 310, the system automatically subdivides the data file into frames and identifies and labels all road features, piloted car features, and other vehicle features identified in each frame. The system may compare road features with a database of known features to identify the feature and apply the corresponding statistical classification algorithm to form a prediction of whether the frame contains a merge scenario. The merge scenario may then be labelled as a feature on the frames at 315.

At 320, a determination is made whether the pilot vehicle has had a successful lane change or unsuccessful lane change based on relativity features such as the lateral position at time $t_{start}$ versus the change in lateral position at time $t_{end}$ as well as the change in identified lane type over time in the data frames. If the lane change is determined to be successful, the process proceeds to 325 at which the data is labelled as a successful lane change. If it is determined that the lane change was unsuccessful at 320, the process proceeds to 330, at which the data may be discarded.

Following 325, the process proceeds to 335 at which the identified features in the frames identified as containing a successful lane change may be sent to the yield determination unit which, may automatically identify and label other vehicles in the sub-windows as yielding or not yielding at 335 based on the annotated features. For example, in column 260, Vehicle 1 ($V_1$) has an initial position $V_{pi}$ at tstart that is less than, or behind, the piloted car's $C_{pi}$ (position initial). At time $t_{end}$, $V_1$ has a final position $V_{pf}$ that is still behind the $C_{pf}$ (position final), so the unit labels $V_1$ yielding. In column 2, a second Vehicle ($V_2$) is shown with labelled features resulting in $V_2$ being labelled not yielding 265. $V_2$ has an initial position ($V_{pi}$) that is greater than, or in front of $C_{pi}$ and a position at $t_{end}$ that is still greater than the final position of the piloted vehicle ($C_{pf}$). Therefore, the vehicle may be labelled not yielding. The protocols may be carried out for each vehicle $V_x$ identified in the frames 150 of image data captured during a driving maneuver.

Following the yield decision subroutine the integrity of the annotated file is checked at 340 and any erroneous data is discarded. For example, vehicles that have been labelled both yielding and not yielding, or vehicles whose duration of detection was too short, indicating false detection of another vehicle, may be discarded. Then, the checked file may be saved and transmitted to a server or cloud storage to be processed 340. The processed annotated data points may then be added into a machine learning module 350 of driving behavior and the process is terminated 360.

The automatic yielding and not yielding labeling subroutine for a successful lane change are shown in FIGS. 4A-D.

FIG. 4A shows a plan view of the successful lane change labeling subroutine of a vehicle behind the piloted car at $t_{start}$ and immediately behind the piloted car at $t_{end}$ being labelled yielding. As seen in FIG. 4A, when another vehicle 420 is detected behind the piloted vehicle 10 at the start of the driving scenario at time $t_{start}$, a lane change of the piloted vehicle has been identified 415, and the other vehicle 420 is directly behind the piloted car 10 at the end of the maneuver, tend, the system will automatically label the other vehicle 420 yielding.

FIG. 4B is a plan view of the successful lane change labeling subroutine showing a vehicle in front of the piloted car at time $t_{start}$ and immediately in front of the piloted car at $t_{end}$ being labelled not yielding. Thus, when another vehicle 405 is detected in front of the piloted vehicle 10 at time $t_{start}$ and after the lane change 415 is still in front of the piloted vehicle 10 at tend, the vehicle 405 is labelled not yielding as illustrated in FIG. 4B.

FIG. 4C is a plan of the successful lane change labeling subroutine view showing all other identified vehicles that passed the piloted car and are not immediately adjacent the piloted car at time $t_{end}$ as shown in FIGS. 4A-B are labelled not yielding. The yield determination subroutine may continue to search the annotated files for other movement, that has been identified and labelled as other vehicles that did not start or finish adjacent the piloted vehicle 10 and apply the labeling subroutine to those vehicles as well. For example, in FIG. 4C, all vehicles that were identified behind the car 425 and were identified in front of the car 425 after the lane change 415 are deemed to have passed the piloted car 10 and therefore labelled not yielding.

FIG. 4D is a plan view of the successful lane change labeling subroutine showing all other identified vehicles that were passed by the piloted car and are not immediately adjacent the piloted car at time $t_{end}$ as shown in FIGS. 4A-B, are labelled yielding. As seen in FIG. 4D, all vehicles identified in front of the car 430 and identified behind the piloted car 10 after lane change 415 are labelled yielding.

Although the illustrative embodiments have been explained in terms of a forced merge driving scenario, other yielding and non-yielding subroutines may be programmed, for example, for yielding behaviors at a four-way intersection. Additionally, although the illustrative embodiments have been explained with respect to a piloted vehicle, it is possible that the system can be part of an on-board system in an autonomously driven vehicle.

FIG. 5 is a diagrammatic view of a process as illustrated in FIG. 1, applied to an entire fleet of vehicles, increasing the data points added to the machine learning model. The data points collected from one vehicle may be aggregated from a fleet of vehicles as shown in FIG. 5 to create a better model to estimate driver yield behaviors. In this model, data files of merging driving scenarios of multiple vehicles are recorded 505 and the particular scenarios are identified 510 for each vehicle data file. Next, the data features as described above including the yielding features are automatically labelled, and the labelled files are uploaded to the cloud for processing 515. The labelled features and associated merge scenario are added to the machine learning module to continuously improve its accuracy with more data 520.

The above-described components, including perception annotation module 225, car feature subunit 230 other vehicle feature subunit 235, road features subunit 240 relative features subunit 245, and the yield determination unit 250 may be implemented in software, compiled and stored to a memory as object code, and during operation of the vehicle, may be invoked for execution by one or more processors. In one implementation, the above-described components are implemented as a single system on a chip. The interconnections among the above-described components can be provided through any suitable electronic communication mechanism, such as a communication bus. Thus, yield determination system 200 may be implemented as software complied into object code on one or more memories that, during runtime, are invoked for execution by one or more processors. Databases of known feature images may be implemented in a database using any known database environment, such as Oracle, DB2, or SQL Server.

In light of the foregoing, the system may be programmed to automatically collect label and upload machine learning model data for autonomous driving involving scenarios that involve social cooperation with other vehicles. Utilizing models obtained through machine learning of collected data from a fleet of vehicles is a preferred way to replicate human-like driving behavior by being able to better predict the driving behaviors of other vehicles and, therefore, eliminating timid, foolish behavior exhibited by existing autonomous driving systems in social cooperation driving situations. The automatic collection, labeling, and uploading allows for acquisition of the vast amount of data required to create and update the machine learning model. The disclosed embodiments differ from the prior art in that they provide a system and methodologies for automatic collection, labeling, and uploading of vehicle features and other surrounding vehicle features. Conventional systems and methods require collecting and manually labeling data, or even outsourcing the manual labeling of data to services such as Amazon Mechanical Turk.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system installed in a determination vehicle for determining yielding behaviors of other vehicles comprising:
   an input sensor for receiving a signal indicating the start of a driving maneuver and a second signal indicating the end of a driving maneuver;
   a vehicle data recording module that saves recorded vehicle sensor data in response to input signals indicating the start and stop of the driving maneuver creating recorded data,
   a vehicle perception annotation module configured to automatically detect and label features in the recorded data of the vehicle including features of the determination vehicle, features of other vehicles surrounding the determination vehicle; and features of the road, and
   means for automatically determining that a detected vehicle is yielding to the piloted vehicle based on the features of the determination vehicle, other detected vehicles, and the road, and in response to the determination, and automatically labeling the detected vehicle as yielding or not yielding in the recorded data.

2. The in-vehicle system of claim 1, wherein the input sensor is configured to receive a signal from one of a turn signal indicator, indicating the start and end of the driving maneuver by the signal being turned on and off, and a navigation system configured to detect when the vehicle is in a geographic proximity to an intersection and has passed through the intersection indicating the start and end of the driving maneuver.

3. The in-vehicle system of claim 1, wherein the input sensor is configured to receive a signal from a global positioning system (GPS), and the vehicle data recording module is configured to continuously record a thirty second buffer of sensed vehicle data; wherein in response to a signal from the GPS indicating a lane change, the thirty second buffer is saved as a recorded data of the vehicle.

4. The in-vehicle system of claim 1, wherein the means for determining that a detected vehicle is yielding to the determination vehicle comprises a processor that compares relative positions of the detected vehicle to the determination vehicle over time.

5. The in-vehicle system of claim 1, further comprising:
   a memory unit configured to store the labelled recorded data file; and
   a transmitter to automatically upload the labelled recorded data to a server for further processing,
   wherein the further processing includes extracting the labelled data points for integration into a behavior machine learning module.

6. The in-vehicle system of claim 1, wherein the means for determining a detected vehicle is yielding comprises computer code stored on a non-transitory medium, that when executed on a processor, causes the system to:
   when an unsuccessful lane change is detected, discard the recorded data; and
   when a successful lane change is detected,
   causes the system to search the data file, identify other vehicle, and label all other vehicles as yielding or not yielding based on the labelled relative features.

7. The in-vehicle system of claim 1, wherein the determination vehicle features that are automatically identified and labelled in the recorded data include velocity, acceleration, lateral position, and the space in front of and behind the vehicle.

8. The in vehicle system of claim 1, wherein the features comprise relative features including the relative velocity of another vehicle to the determination vehicle, the relative acceleration of another vehicle to the determination vehicle, the relative change is the size of the space in front of and behind the vehicle and other identified vehicles.

9. The in-vehicle system of claim 8, wherein the relative features between the determination vehicle and the road include a determination that the vehicle has successfully changed lanes on the road.

10. The in-vehicle system of claim 8, wherein the relative features of the determination vehicle and other vehicles include a determination of the relative position of another vehicle to the determination vehicle when it is first detected in the recorded data and a relative position of the other vehicle to the determination vehicle when the determination vehicle is last detected in the recorded data.

11. The in-vehicle system of claim 1, wherein the a vehicle data recording module starts and stops recording vehicle sensor data in response to input signals indicating the start and stop of the driving maneuver.

12. The in-vehicle system of claim 1, wherein the vehicle data recording module continuously records data in a buffer.

13. The in-vehicle system of claim 1, wherein the features comprise features of the other detected vehicles including velocity, acceleration, gap to the front of the other detected vehicles and gap to the rear of the detected vehicles.

14. A method for automatically determining and labeling yield behaviors of vehicles during a driving maneuver comprising:
   detecting the start and stop of a driving maneuver,
   saving vehicle sensor data from when the driving maneuver starts when the driving maneuver stops,
   automatically detecting and labeling features of the determination vehicle in the data
   automatically detecting and labeling features of other vehicles in the data
   determining whether the determination vehicle has successfully completed a lane change,
   selecting a successful lane change yield determining and labeling subroutine in response to a determination that the determination vehicle has successfully completed a lane change, and
   applying the successful lane change yield determining subroutine to automatically determine the yield behaviors of the other vehicles in the data; and labeling the other vehicles yielding or not yielding in the data file.

15. The method of claim 13, further comprising discarding the recorded data in response to a determination that the determination vehicle has not successfully completed a lane change.

16. The method of claim 13 further comprising:
   performing an integrity check on the labelled data;
   discarding any vehicles that have been labelled both yielding and unyielding;
   automatically uploading the labelled data to a cloud; and adding labelled features from the labelled data to a driver yield behavior machine learning model.

17. The method of claim 13, further comprising starting and stopping recording vehicle sensor data in response to detecting the start and stop of the driving maneuver.

18. The method of claim 13, further comprising continuously recording vehicle sensor data in a buffer.

* * * * *